UNITED STATES PATENT OFFICE.

ARTHUR LÜTTRINGHAUS AND HEINRICH von DIESBACH, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

YELLOW VAT DYE.

1,018,837.  Specification of Letters Patent.  Patented Feb. 27, 1912.

No Drawing.  Application filed November 3, 1911.  Serial No. 658,388.

*To all whom it may concern:*

Be it known that we, ARTHUR LÜTTRINGHAUS and HEINRICH VON DIESBACH, the first a subject of the King of Prussia and the second a citizen of the Swiss Republic, residing at Mannheim, Germany, have invented new and useful Improvements in Yellow Vat Dye, of which the following is a specification.

Our invention relates to new coloring matters which we regard as dianthraquinone-thioxanthones of a constitution corresponding to the formula

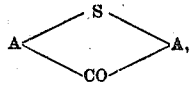

where A represents an anthraquinone residue, either substituted or not.

We can prepare the simplest representative of our new coloring matters by first treating 1-chlor-anthraquinone-2-carboxylic acid with beta-mercapto-anthraquinone and then treating the product with a condensing agent such, for instance, as concentrated sulfuric acid, until a thioxanthone ring is formed.

Our new coloring matters consist, when dry, of yellow to brownish yellow powders and, in the pure state, the simplest representative has a percentage composition corresponding to the formula

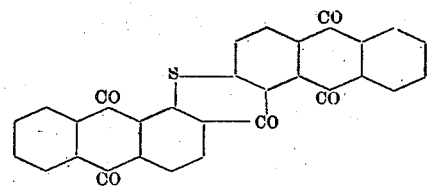

They yield red-brown solutions in concentrated sulfuric acid, green-blue to blue-black vats in alkaline hydrosulfite solution, and dye cotton from these vats golden yellow shades of excellent fastness against the action of chlorin and light.

The following example will serve to illustrate further the nature of this invention, which, however, is not confined to this example. The parts are by weight. Boil together, for about 8 hours, in a reflux apparatus while excluding air, 29 parts of 1-chlor-anthraquinone-2-carboxylic acid, 22 parts of beta-mercapto-anthraquinone, 12 parts of caustic potash and 300 parts of water. Then filter, acidify the filtrate with dilute acetic acid, filter off the beta-thio-anthraquinonyl-1-anthraquinone-2-carboxylic acid, and wash and dry it. It is a yellow powder which yields a violet-red solution in concentrated sulfuric acid. Heat together, for 1 hour, on the water-bath, 10 parts of beta-thio-anthraquinonyl-1-anthraquinone-2-carboxylic acid produced as above and 100 parts of concentrated sulfuric acid. Pour the reaction mixture into water and extract the coloring matter which separates out with boiling dilute caustic soda solution. It consists of a brownish yellow powder which, if desired, can be recrystallized from organic solvents of high boiling point. It yields a red-brown solution in concentrated sulfuric acid and dyes cotton from the dull green-blue hydrosulfite vat golden yellow shades.

Now what we claim is:—

1. The new coloring matters being dianthraquinone-thioxanthones, which consist, when dry, of yellow to brownish yellow powders which yield red-brown solutions in concentrated sulfuric acid, green-blue to blue-black vats with alkaline hydrosulfite, and which dye cotton from these vats golden yellow shades of excellent fastness against the action of light and chlorin.

2. The new vat coloring matter which possesses a percentage composition corresponding to the formula

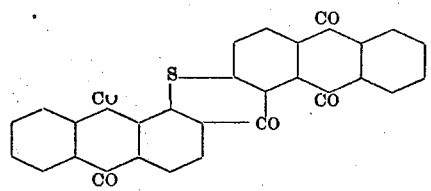

which coloring matter consists, when dry, of a brownish yellow powder which yields a red-brown solution in concentrated sulfuric acid, a dull green-blue vat in alkaline hydrosulfite solution, and which dyes cotton from this vat golden yellow shades of excellent fastness against the action of chlorin and light.

In testimony whereof we have hereunto set our hands in the presence of two subscribing witnesses.

ARTHUR LÜTTRINGHAUS.
HEINRICH von DIESBACH.

Witnesses:
J. ALEC. LLOYD,
JOSEPH PFEIFFER.